United States Patent
Estevez et al.

(10) Patent No.: US 8,175,584 B2
(45) Date of Patent: May 8, 2012

(54) SYSTEM AND METHOD TO FACILITATE DOWNLOADING DATA AT A MOBILE WIRELESS DEVICE

(75) Inventors: Leonardo William Estevez, Rowlett, TX (US); Timothy Jude Newberg, Dallas, TX (US); Mansoor A. Chishtie, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 344 days.

(21) Appl. No.: 12/559,004

(22) Filed: Sep. 14, 2009

(65) Prior Publication Data

US 2011/0065424 A1    Mar. 17, 2011

(51) Int. Cl.
*H04W 4/00* (2009.01)
(52) U.S. Cl. ............... 455/414.1; 709/219; 370/255
(58) Field of Classification Search ........... 455/414, 455/426, 466, 418, 422; 370/216, 255, 390; 709/219
See application file for complete search history.

(56) References Cited

U.S. PATENT DOCUMENTS

| | | | |
|---|---|---|---|
| 7,039,672 B2 | 5/2006 | Wu et al. | |
| 2004/0087304 A1 | 5/2004 | Buddhikot et al. | |
| 2006/0068815 A1 | 3/2006 | Caspi et al. | |
| 2006/0098588 A1* | 5/2006 | Zhang et al. | 370/255 |
| 2006/0104200 A1* | 5/2006 | Park | 370/216 |
| 2008/0039058 A1 | 2/2008 | Ray | |
| 2008/0109852 A1* | 5/2008 | Kretz et al. | 725/62 |
| 2008/0144621 A1* | 6/2008 | Huang et al. | 370/390 |
| 2010/0144330 A1* | 6/2010 | Ahlin | 455/418 |
| 2010/0293253 A1* | 11/2010 | Kaida | 709/219 |

* cited by examiner

*Primary Examiner* — Kent Chang
*Assistant Examiner* — Kashif Siddiqui
(74) *Attorney, Agent, or Firm* — Alan A. R. Cooper; Wade James Brady, III; Frederick J. Telecky, Jr.

(57) ABSTRACT

The invention relates to systems and method to facilitate downloading a data file. In one embodiment, a method includes receiving at a first wireless communication device a request to download a requested data file. A determination is made at the first wireless communication device whether the requested data file is stored at a second wireless communication device with which the first wireless communication device communicates via a local wireless link. If the requested data file is determined to be stored at the second wireless communication device, the first wireless communication device retrieving the requested data file from second wireless communication device via the local wireless link.

14 Claims, 4 Drawing Sheets

SYSTEM AND METHOD TO FACILITATE DOWNLOADING DATA AT A MOBILE WIRELESS DEVICE

TECHNICAL FIELD

The invention relates generally to systems and methods to facilitate downloading data files at a wireless communication device.

BACKGROUND

Improvements in wireless communication devices are continually being developed to meet ever increasing consumer demands. In addition to the standard voice function, current devices often support many additional services and accessories. Such expanded functionality is enabled, at least in part, in view of the enhanced infrastructure available for communication as well as increased processing power of the individual devices.

As an example, many users utilize wireless devices to browse the Internet and download files. The speed of the download is generally dependent on the type of wireless network through which the files are downloaded. For instance, many wireless communication devices, such as cellular telephones, are configured to access data over more than one type of wireless network. Such devices are known as dual or multi-mode devices. Many wireless networks, such as the cellular data networks (e.g., EDGE, GSM or the like) are generally slower than wireless local area networks, such as those implemented according to the 802.11x standards. As more telephones are equipped with cellular data network accessibility, data transfers over cellular data networks tend to occupy a significant portion of the service provider's bandwidth.

SUMMARY

The invention relates generally to systems and methods to facilitate downloading data files at a wireless communication device.

One embodiment relates to a method that includes receiving at a first wireless communication device a request to download a requested data file. A determination is made at the first wireless communication device whether the requested data file is stored at a second wireless communication device with which the first wireless communication device communicates via a local wireless link. If the requested data file is determined to be stored at the second wireless communication device, the first wireless communication device retrieving the requested data file from second wireless communication device via the local wireless link.

Another embodiment relates to a wireless communication device that includes a first wireless transceiver configured to transmit and receive data via a wireless wide area network according to a first wireless technology. A second wireless transceiver is configured to transmit and receive via a wireless local area network data according to a second wireless technology that is different from the first wireless technology. A processor is programmed to execute file access controls that employ the second wireless transceiver to search for a local wireless communication device having already stored therein a copy of a requested data file. In response to locating the local wireless communication device having the requested data file, the file access controls causes the requested data file to be retrieved from the local wireless communication device via the second wireless transceiver.

Another embodiment relates to a system to facilitate acquisition of a requested data file. The system includes a first portable wireless communication device that makes a request to download the requested data file. If the requested data file satisfies predetermined file criteria, the first portable wireless communication device employs a local wireless communication link to discover at least one second portable wireless communication device and to issue a request to the second portable wireless communication device for the requested data file. The second portable wireless communication device is programmed to determine if the requested data file is stored in memory thereof. If the requested data file is stored in memory of the second portable wireless communication device, the second portable wireless communication device is programmed to send a copy of the requested data file directly to the first portable wireless communication device via the local wireless communication link.

DETAILED DESCRIPTION

Figure 1:
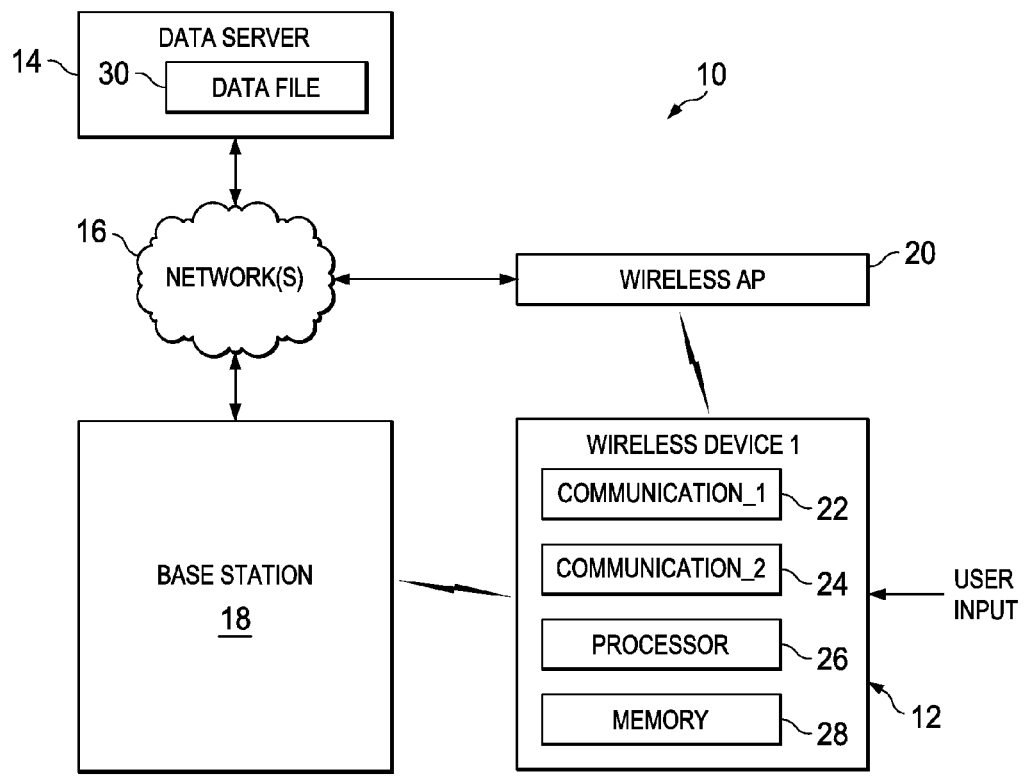
FIG. 1 depicts an example of a communication system in which a wireless communication device can operate.

The invention relates generally to systems and methods to facilitate downloading data files at a wireless communication device. The systems and methods employ the use of distributed storage of data files, such as can be cached in memory of mobile wireless communication devices. In response to a request to download a desired file at a wireless communication device, the device can determine if another wireless communication device has the desired file stored locally in memory. When such other local wireless communication device has already downloaded and stored the desired file (e.g., in response to a user-initiated request at such device), the wireless communication device can retrieve the file from such local wireless communication device through a local wireless link, such as peer-to-peer connection.

As will be appreciated by those skilled in the art, portions of the invention may be embodied as a method, data processing system, or computer program product. Accordingly, these portions of the present invention may take the form of an entirely hardware embodiment, an entirely software embodiment, or an embodiment combining software and hardware. Furthermore, portions of the invention may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments of the invention are described herein with reference to flowchart illustrations of methods, systems, and computer program products. It will be understood that blocks of the illustrations, and combinations of blocks in the illustrations, can be implemented by computer-executable instructions. These computer-executable instructions may be provided to one or more processor of a computer, special purpose computer (e.g., a handheld or portable communication device), or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

FIG. 1 depicts an example of a wireless communication system 10 that can be utilized to facilitate retrieving and storing a data file at a wireless communication device 12. While a single wireless device 12 is depicted in the example of FIG. 1, it would be understood and appreciated that there can be any number of a plurality of wireless devices within the system 10. The wireless device 12 can be implemented as a cellular telephone, a personal digital assistant (PDA), a laptop computer, a portable game system or other device capable of communicating wireless with other local devices over a wireless communication link.

In the example of FIG. 1, the wireless device 12 can be in wireless communication with a data server 14 through one or more networks depicted at 16. For example, the wireless communication device 12 can be in wireless communication over a first wireless network via a base station 18. The base station can be a cellular base station that provides cellular voice and data communication as part of a wide area network. Additionally or alternatively, the wireless device 12 can wireless communicate with a wireless access point (AP) 20. The wireless AP 20 can communicate with the data server 14 through the network 16. Thus, the wireless device 12 can access data file 30 via the wireless AP 20, as is known in the art.

In order to accommodate multiple types of wireless technologies, the wireless device 12 can include any number of two or more communication modules, depicted as COMM_1 22 and COMM_2 24. Each communication module 22 or 24 is programmed and configured to provide for communication via a respective one of the base station 18 or access point 20 according to corresponding radio technology and protocols. The wireless communication device 12 also includes a processor 26 and memory 28 that is programmed to control the operating functions of the wireless device. The memory 28 can also be utilized to store data, such as in the form of video, audio, text and/or application files.

By way of further example, the wireless device 12 can connect to the data server 14 such as for downloading a data file 30. The data file can be located in the network via a corresponding resource identifier, such as a uniform resource locator (URL). The time required for the wireless device 12 to download the data file from the server 14 depends largely on the available bandwidth for the connection from the wireless device to the network 16. The bandwidth varies for different types of wireless communication technologies. For instance, a wireless connection from the wireless device 12 to the wireless AP 20 often provides download speeds typically ranging anywhere from 1 to 100 megabits per second (Mbps), which can further vary according to the type of modulation techniques and standards implemented by the wireless access point 20. In this example, the wireless device uses communications module 22 to access the network 16 via the wireless AP 20.

For the example where the wireless communication device 12 is a cellular telephone, the device can be configured to employ the communication module 22 to transmit and receive cellular data through a wide area cellular data network that includes the base station 18. Examples of cellular data networks include the enhanced data rates for GSM evolution (EDGE) or third generation mobile telecommunications technologies (e.g., universal mobile telecommunication system (UMTS) or GSM based technologies) as well as extensions of the third generation technologies, including 3GPP or WiMax. Due to the increased versatility and data capabilities associated with many wireless devices 12, the extensive data transfers through the base station 18 can result in significant utilization of available bandwidth. Accordingly, the systems and methods described herein provide an alternative approach to retrieve requested data files using faster local wireless connections, as appropriate. The local connections can be implemented as peer-to-peer wireless connections between different wireless devices.

In order for a requestor wireless device to retrieve a desired data file from a source wireless device, such as the device 12, the source wireless device must already have the desired file stored in its memory 28. For instance, in response to a request to download the file 30, the wireless device 12 can connect to a primary data source (the data server 14) and retrieve the data file through the network 16. The request for the file 30 can be initiated by a user at the wireless device or the request can be initiated in connection with other types of data transfer. For instance, the request can be initiated automatically by an application running on the wireless device 12 or indirectly in response to a user accessing a web page. Additionally, as used herein the term "data file" is intended to encompass any type of data that can be transferred via a wireless communication link. Examples of such files can include media files, which may be sent as a single file for storage in memory or be streamed via an appropriate streaming protocol for playout on the device 12. Alternatively, or additionally, the file 30 can be implemented as a large embedded image or other element (e.g., streaming media) that can be embedded in a webpage being accessed via the wireless device 12.

Since the wireless device 12 is a dual or multi-mode device, the retrieval can be performed using a selected and available one of the communication modules 22 or 24 and one of the respective data paths, such as the local wireless network via the wireless AP 20 or the wide area cellular data network via the base station 18. The data file 30 can then be stored in the memory 28 of the wireless device 12. If file exceeds a predetermined file size, a log entry can be also stored in the memory 28 associated with the data file 30 stored therein. The log entry can identify file attributes, such as file size, file name and URL where the file was obtained.

While the example of FIG. 1 demonstrates two possible wireless links that can be utilized to obtain and retrieve the data file 30 from the data server 14, it is to be understood that the wireless device 12 can alternatively obtain the data file from another mobile wireless device, as described herein. If another wireless device is not available for obtaining the requested data file, the wireless device will obtain the data file from the primary data source, namely the data server 14, as described herein.

Figure 2:
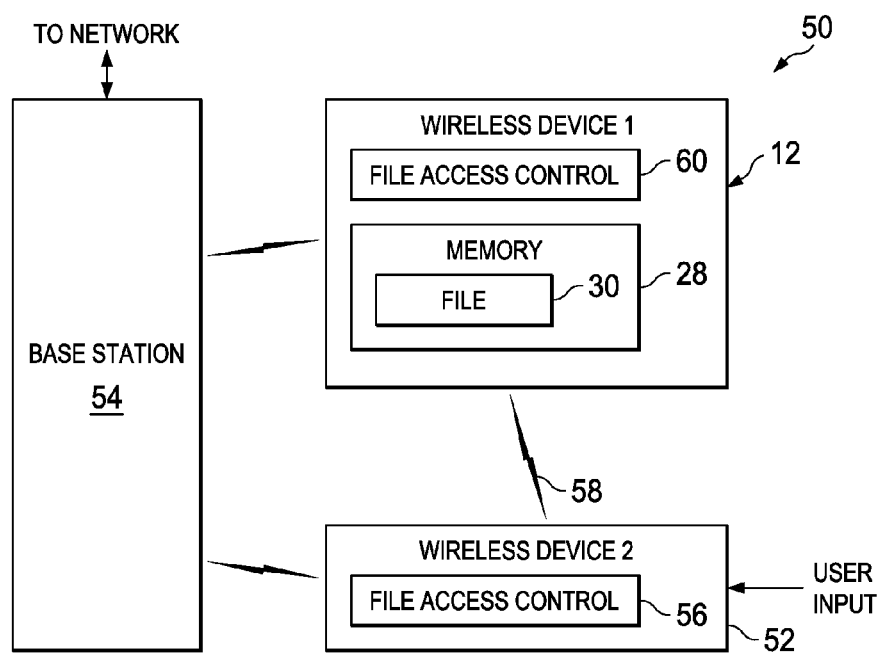
FIG. 2 depicts an example of multiple wireless devices operating to transfer a cached data file.

FIG. 2 depicts an example of a system 50 in which a second wireless device 52 can obtain the data file 30 from the first wireless device 12. In the system 50 of FIG. 2, each wireless device 12 and 52 can be in wireless communication with a base station 54, such as the base station 18 described with respect to FIG. 1. For instance, each wireless device 12 and 52 can employ a cellular data network that includes the base station 54 to access data servers (e.g., web servers) to obtain and download data files. Typically, each wireless device 12 and 52 will operate through a common base station, although this is not required to enable data retrieval from another wireless mobile device.

A user can employ the second wireless device 52 to browse websites and identify a data file to be downloaded. The file can be identified explicitly by the user or indirectly by an application or in connection with accessing a URL. In response to requesting a data file the wireless device employs a file access control application 56. The file access control application 56 is programmed to identify and control from where the second wireless device 52 obtains the requested data file. Thus, initially a file is identified for download at the second wireless device 52. The wireless device can identify the desired file by file attributes, such as including a file name, creation time, expiration time, size and a resource locator or identifier (e.g., a URL) for the file. For example, creation time and expiration time can be utilized by controls implemented in either or both 12 and 52 to determine and control whether, how many times or a time window during which a given file or element can be reused by different wireless devices.

In the example scenario of FIG. 2, the first wireless device 12 already has a copy of the file 30 stored in its memory 28. The memory 28 can also store a log that identifies a set of files and file attributes, such as resource identifiers, file names, and file size associated with the file available for download from the source wireless device 12 through peer-to-peer wireless connections. Thus, the wireless devices 12 and 52 (e.g., a cellular telephone, PDA, or other portable device having wireless communication capabilities) can operate as a mobile data cache for data files that have been downloaded into its memory in response to user requests at such device.

In response to initiating a file download at the requestor device 52, the file access control 56 at the wireless device 52 determines the size of the requested file, such as is provided by a web server at which the file was accessed by the second wireless device. If the size of the file is determined to exceed a predetermined threshold (e.g., greater than 1 megabyte), the file access control 56 can initiate a scan for other local wireless devices capable of communicating over a local wireless link, depicted at 58. The local wireless link 58 can be implemented as a peer-to-peer wireless connection utilizing a known wireless communication technology, such as the 802.11x technologies as are known in the art.

The file access control 56 can be configured to automatically make such connection to one or more other wireless devices (e.g., the device 12). If the communication module in the device 52 that communicates over the link 58 is not already turned on, the file access control 56 can automatically turn it on to initiate the scan. In this way, the file access control 56 can transparently scan to determine whether the link 58 is available is available. Alternatively, the file access control 56 can and present this alternative connection opportunity as a manual option to the user via a graphical or text-based user interface at the device 52 to require user authorization before downloading the file, as initiated by the user. Additional determinations can be made to ascertain a relative connection speed for the link 58, such as including whether the link 58 would be faster for downloading the file from the wireless device 12 than using cellular data network via the base station 54 to access the file from a primary resource web server (not shown). After performing such scan, if it is further determined to no other wireless device are available, the file access control 56 can turn off the communication module and thereby conserve power.

By way of further example, a user may be located at a sporting event or other venue having a plurality of individuals, many of which have cellular telephones or PDA's, handheld game systems or the like devices configured to enable wireless data communication. A portion of such wireless communication devices can be programmed and configured with file access control applications and, therefore, capable to operate as mirror site or server of data files stored thereon. Part of such functionality allows the device to automatically respond to an initial query from the wireless device 52, such that the device 52 can generate a list of possible wireless devices that can be queried via such local wireless connection to ascertain whether such devices include a copy of the requested file. The second wireless device 52 can sort the list of devices based on history, signal strength or other criteria (e.g., historical information ranking reliable sources of data) to facilitate retrieving the file.

Based on the sorted list, the second wireless device 52 can connect to another wireless device 12 through a peer-to-peer wireless connection 58 and send a query to determine if the wireless device 12 includes a copy of the desired file. The query can identify the file by one or more file attributes, such as a resource identifier (e.g., URL), file name, file size or other descriptors. If the wireless device 12 already has a copy of the file, it can employ its file access control 60 to respond to the request with an affirmative acknowledgement. The second wireless device 52 can in turn request the file 30 from the connected wireless device 12 through the local wireless link 58. The file access control 60 of the first wireless device 12 in turn handles responses and sending a copy of the file 30. The file access control and sending of the file can be performed at the device wireless 12 as part of a background process so as not to adversely affect user experience at the first wireless device. The file access control 60 of the first wireless device further can be disabled or enabled, which can occur manually in response to the user disabling the functionality. Alternatively, the file access control 60 can be disabled automatically, such as in response to detecting a low battery or other condition that might adversely affect performance.

As a further example, users can be part of a social networking group and the system 50 enables videos and other media previously viewed by one or more users to be cached on their wireless devices and shared with nearby friends via the wireless link 58. Each device further can be programmed to allow each user to manually enable or disable such file sharing functionality. Additionally, when programmable by the user, the file access control further can be programmed with a trusted set of users, such as by allowing each user to permit access to its stored filed. Alternatively, the file access control can implement such functionality transparently without distinction or authorization by requesting devices.

While the example of FIG. 2 describes the device 52 as the requestor and the device 12 as the source wireless device for the data file 30, it will be appreciated that each device can be configured to operate as both a requestor and source device.

Figure 3:
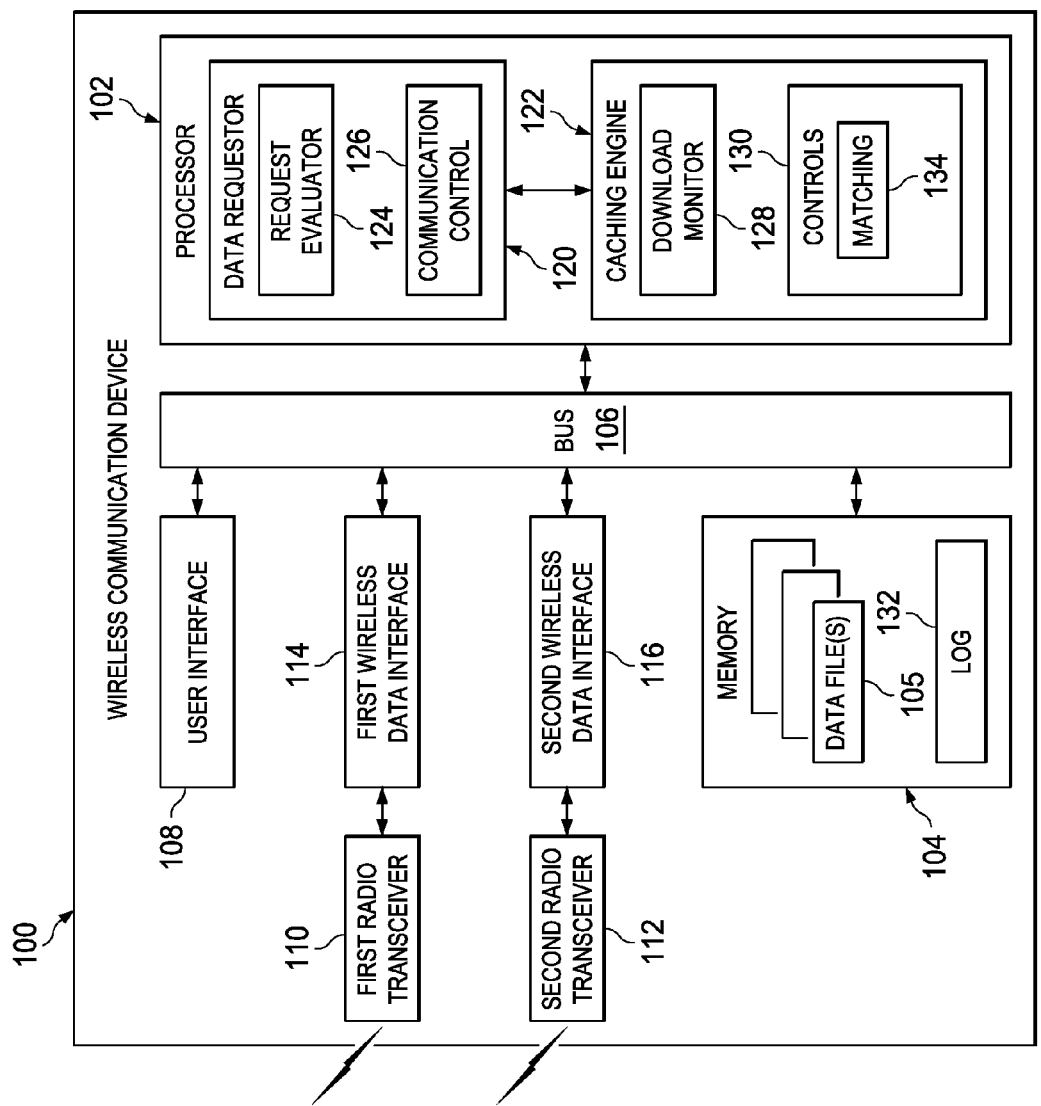
FIG. 3 depicts an example of a wireless communication device.

FIG. 3 depicts an example of a wireless communication device 100 and is programmed and configured to enable peer-to-peer connections for sending and receiving data files.

That is, the device 100 can both operate as a requestor and a source for data files, such as described with respect to the example scenario of FIG. 2. The wireless communication device 100 includes a processor 102 and memory 104 programmed and configured to control operation of the wireless communication device. It is to be understood and appreciated that the processor 102 can be a co-processor that is implemented in the wireless communication device 100 in addition to a main CPU (not shown) that handles a general operation and functionality of the wireless device. That is, the processor 102 can be dedicated to controlling downloading data files into the device 100 or for responding to requests for sending data files 105 already cached in its memory 104 to another wireless device via a local wireless link. The data files 105 stored in the memory 104 can operate as a local mirror site that can be accessed by a local requesting wireless device through the local wireless link.

In the example of FIG. 3, the processor 102 is coupled to the memory 104 via a bus 106. One or more user interface 108 is also coupled to the bus 106 for enabling human-machine interaction with the wireless communication device, such as can include browsing, entering requests for data and activating applications and other functions implemented by the wireless communication device 100.

The wireless communication device 100 can be a dual or multimode device having a plurality of radio transceivers, depicted in the example of FIG. 3 as first and second radio transceivers 110 and 112. Each radio transceiver 110 and 112 can be coupled to the bus 106 through corresponding wireless interfaces. For purposes of downloading or sending data wirelessly, the wireless interfaces are depicted as wireless data interfaces 114 and 116 that are configured to send and receive data via the respective radio transceivers 110 and 112. Each transceiver can be programmed and configured to communicate according to a corresponding wireless data communication technologies. As an example, the first radio transceiver 110 and first wireless data interface 114 can be utilized for cellular data communication such as through a base station of wide area cellular data network. The second data interface 116 and transceiver 112 can be configured for data communication via a wireless local network or peer-to-peer connection, such as according to the IEEE 802.11x technologies.

The processor 102 is programmed with file access control applications including a data requestor 120 and a caching engine 122. The data requestor 120 includes a request evaluator 124 that is programmed to evaluate a data request initiated by user (e.g., via the user interface 108) and ascertain an appropriate resource from which to obtain the requested data. The initial request for data, for example, can be made over the first radio transceiver 110 (e.g., via cellular data network). The request evaluator 124, for example, can identify the request as either corresponding to a media purchase or downloading or a large file. A purchase can be detected by detecting a request for a secure connection (for the purchase).

In response to identifying the request as a type requiring a faster wireless connection (e.g., a file purchase and/or a large file), the data requestor 120 can employ a communication control module 126 to select an appropriate data path for retrieving the data, which may determine the source from where the requested data file is downloaded. The path may include first radio transceiver 110 (e.g., employing a first wireless technology, such as cellular data) or the second radio transceiver 112 (e.g., employing a second wireless technology, such as 802.11x). The communication control module 126 can select the data path depending on the size of the data file. The communication control module 126 thus can employ the second transceiver 112 and its wireless interface 116 to transparently scan to for one or more possible sources. If the scan identifies one or more available local sources, connections can be sequentially initiated automatically for performing the file download or, alternatively, the file access controls can present connection options to the user (e.g., via the user interface 108) before initiating the connections for file download.

As an example, if the size of the requested file is below a threshold, the communication control module 126 can maintain the current wireless link to download the requested data file such that the file will be downloaded from the primary source (e.g., location on a data server) where the file was originally located. If the data file exceeds the predetermined threshold, the communication control module 126 can employ the second radio transceiver 112 and the second data wireless interface 116 for locating local wireless devices that may contain a copy of the data file. If the second radio transceiver is turned off, the communication control module 126 can automatically turn on and activate the transceiver 112 and scan for discovery of possible local sources of the desired data file. If a local connection is not available, the transceiver 112 and interface 116 can be returned to its original state.

When the scan reveals multiple possible local download sources, the communication control module 126 can sort a list of available local wireless devices discovered via the scanning process into an order designed to facilitate the downloading process. The order, for example, can be based on signal strength of the wireless connection, history (e.g., how many times data has been retrieved from the local wireless device) or a user-defined trusted list. The communication control module 126 may also truncate the list to a fixed number of devices that may be queried in order to determine if a wireless device includes a copy of the requested file. If a local access point is available for communication through the second radio transceiver (and not already connected), the communication control module 126 can automatically connect to the available access point for connection to the primary source (e.g., URL) for downloading the requested data file. Thus, the file access controls at the device 100 seeks to locate a wireless connection to download the file at a high data rate for user convenience and without use of bandwidth in its cellular data network.

The caching engine 122 is programmed to control storing data files 105 in the memory and sending stored files in response to a request from another local wireless device. The caching engine 122 includes a download monitor 128 that is programmed to monitor downloads, store the data files(s) 105 in the memory 104 and create a corresponding log file 132. The log file 132 can be utilized to facilitate access, retrieval and sending of the data file to a requestor device, such as through a peer-to-peer wireless connection described herein. The log file 132 can include descriptors or metadata for each of the stored data files 105. For example, the log file 132 can be implemented as a look-up table that includes the creation time and file expiration time. Thus, the caching engine or other methods can be programmed to remove or delete a given file or otherwise make it unavailable for subsequent download or reuse after its expiration time has been exceeded. Other log file attributes may include file name, the resource identifier for the file as well as the size of each data file 105.

The caching engine 130 also includes controls 130 for handling requests for data. The controls 130 can include a matching function 134 that compares the criteria in the log file 132 with information in a data file query received from a nearby local wireless device to determine if a data file stored in the memory 104 matches a file that is being requested by the local wireless device. The matching engine 134 can look for an exact match between the information stored in the log 132 and in the received query. Alternatively, matching can be performed on a statistical or other basis such that a sufficiently high likelihood of a match can be utilized to respond that file is stored locally and then send the file. For instance, if the file size is not identical but the file name, version number and URL as well as one or more attributes match, an affirmative response to the query can be provided to the requestor device.

If a match exists, the controls 130 further can control accessing the file form the memory 104 based upon the information in the log file 132. The controls 130 thus can be utilized to access the data file from the memory based upon the information in the log 132. Thus, the controls 130 can work in conjunction with communication control module 126 to send the requested data file through the second data wireless interface for packetizing the data and sending it over the second radio transceiver 112 to the requesting local wireless device. The communication of the data file to the requestor can be performed directly over a wireless peer-to-peer connection or other type of wireless connection (e.g., via an ad hoc wireless network through a router or access point).

Figure 4:
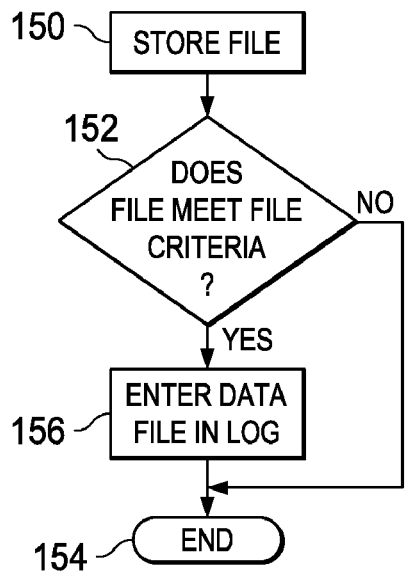
FIG. 4 is a flow diagram illustrating a method associated with storing and logging a data file at a wireless communication device.
Figure 5:
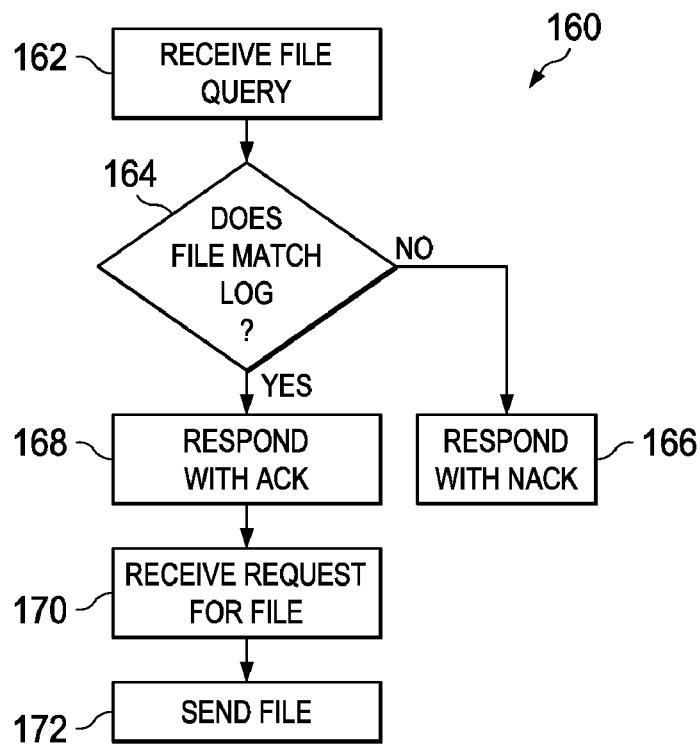
FIG. 5 is a flow diagram depicting a method for sending a requested data file from a wireless communication device.
Figure 6:
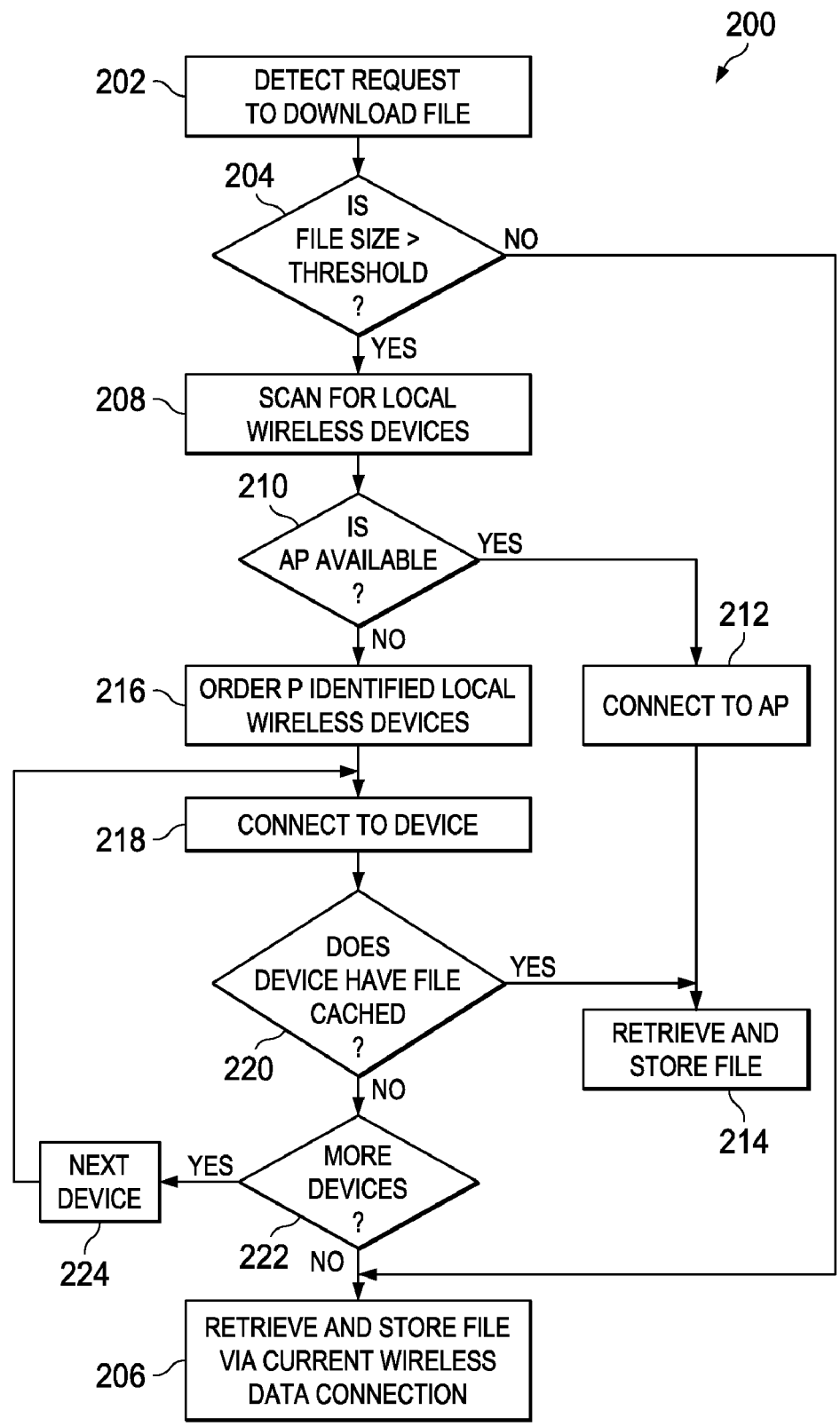
FIG. 6 is a flow diagram depicting a method for retrieving a desired data file at a wireless communication device.

In view of the structural and functional features described above, certain methods will be better appreciated with reference to FIGS. 4, 5, and 6. It is to be understood and appreciated that the illustrated actions, in other embodiments, may occur in different orders or concurrently with other actions. Moreover, not all features illustrated in FIGS. 4, 5 and 6 may be required to implement a method according to the subject invention. It is to be further understood that the following methodology can be implemented in hardware (e.g., one or more processors, coprocessor or ASIC, such as in a mobile wireless communication device), software (e.g., stored in a computer readable medium or as executable instructions running on one or more processors), or as a combination of hardware and software.

FIG. 4 depicts an example of a method that can be implemented by a wireless communication device such as by the caching engine 122 of FIG. 3. In FIG. 4, it is presumed that a downloaded data file is being stored in memory of the wireless device as indicated at 150. As the data file is stored, a determination is made as to whether the file being downloaded meets predetermined file criteria. As mentioned above, the file criteria can relate to manner of download (e.g., downloading over a secure connection) and/or the file itself (e.g., file size). For example, the determination can include ascertaining whether the size of the file exceeds a predetermined threshold. If the predetermined threshold is not exceeded, the method can end at 154, and no log entry will be made for the file. If the file size is exceeded (or other criteria is met), the method proceeds to 156 and an entry in the log file can be made for the respective file being stored in memory. It will be appreciated that a separate copy of the file can be stored in dedicated memory for a web cache, which can be in addition to and separate from the copy stored for use by the wireless device. As described herein, the log file can be a look-up table that is utilized to ascertain whether a file is stored in the memory such as can include a resource identifier, file name or other attributes associated with the file that can facilitate identifying the file.

FIG. 5 depicts an example of a method 160 that can be implemented by a wireless communication device that is capable of serving the data file to a requesting communication device. At 162, a query for a data file is received. The query can include the file name, the file size, as well as other attributes associated with the data file that is being requested by a local wireless device. At 164, a determination is made as to whether the requested file matches any file in the local log that has been generated by the device implementing the method 160. If there is no match, the device responds to the requestor with a negative acknowledgment or NACK, indicated at 166. If the requested file matches with information in the log, the method proceeds to 168 in which a positive response or acknowledgement is provided to the requestor. At 170, a request for the file is received (presumably in response to the positive acknowledgement). In response to the request for the file, at 172, the file is sent to the requestor via a local wireless link, such as a peer-to-peer connection. The sending can be performed automatically via file access functions and controls accessing the file from memory and sending it to the appropriate data wireless interface and to the requestor through the peer-to-peer wireless connection.

FIG. 6 depicts an example of a method 200 that can be implemented at a wireless communication device in connection downloading a user-requested data file (e.g., media file, application file or the like). At 202, a request for downloading file is detected. The request can be detected by monitoring a web browser or other application that can be utilized for accessing a file, monitoring high level operating system, wireless connection controls or the like.

At 204, a determination is made as to whether the requested file has a size that exceeds a predetermined threshold. The threshold can be programmable, such as by a user or by the network provider of the wireless device. If the file size is sufficiently small and does not exceed the threshold (NO), the method can proceed from 204 to 206 in which the requested file can be retrieved and stored via the current wireless data connection. Thus, for example if the initial request was made while accessing the data source through a cellular data connection, the file will be downloaded via the cellular data connection. Since the file size is small and below the threshold the download should proceed in a relatively short amount of time.

At 204, if the file size is determined to exceed the threshold, the method proceeds to 208. At 208, the wireless device initiates a scan for discovery of local wireless devices, such as connections according to the 802.11x standards. The scan thus can be utilized to identify a set of one or more wireless devices that may be capable of responding with a copy of the requested data file if such devices have already stored the copy of data. At 210, a determination is made as to whether a local wireless access point is available. The local access point can be identified based on the results of the scan implemented at 208. If the local wireless access point is available, the method proceeds to 212 in which the wireless device can be connected to the access point and in turn to the resource (e.g., URL) for accessing the requested file from the data server. From 212, the method proceeds to 214 in which the requested file is retrieved and stored via the wireless link through the access point, which can connect directly to the primary source of the data file.

If no access point is available at 210, (NO) the method proceeds to 216 in which the P identified local wireless access devices are sorted into an order, where P is a positive integer denoting the number of wireless devices that may be examined for locating a copy of the requested data. It is to be understood that the set of P devices can be a subset of the available devices and may be sorted in order according to signal strength and/or historical information. Historical information can identify the number of times files have been successfully downloaded from a given local wireless. For instance, if a given wireless device has been successfully accessed for downloading files it may receive a higher score so as to be placed near the top or at the top of the devices.

At 218, the wireless device connects through a local wireless link to another wireless device. The connection can be a peer-to-peer wireless connection or can be through a router, as appropriate. At 220, a determination is made as to whether the connected device has a copy of the requested file cached in its memory. If the determination is affirmative (YES), the method proceeds to 214 to retrieve and store the requested file. If the wireless device to which the requestor is connected does not have a copy of the file, the method proceeds to 222. At 222 a determination is made as to whether there are any more devices in the list that is ordered at 216. If there are additional devices, the method proceeds to 224 to identify the next device, such as by incrementing through the list. The method can then repeat to 218 to 222 in connection with locating a wireless device that might have a copy of the file. If there are no more devices in the list, at 222, the method proceeds to 206.

At 206 the wireless device/requestor can receive and store a copy of the file using the wireless connection for accessing the file from the primary source (e.g., a data or web server) where it was originally accessed by the requestor.

In view of the foregoing, it will be appreciated that the systems and methods disclosed herein provide an approach that can establish an ad hoc mesh network between nearby portable wireless devices (e.g., cellular telephones, PDAs, laptops, portable games or other wireless-enabled devices). As described herein, mobile web cache servers/agents can be implemented on one or more such handhelds based on data that is downloaded and stored in memory of such devices. Other mobile users can be automatically redirected to local contents available within the mesh network via a wireless link instead of using a WAN/Internet connection through a cellular data network. As a result, network operators' radio bandwidth will be reduced accordingly. Operators can also charge for additional services that are built on top of such a network. Monetary incentives can also be provided to subscribers who allow such mobile web cache system on their handhelds.

What have been described above are examples and embodiments of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications and variations that fall within the scope of the application, including the appended claims.

What is claimed is:

1. A method comprising:
receiving at a first wireless communication device a user request to download a requested data file;
determining at least one attribute of the requested data file, wherein if the determined at least one attribute of the requested data file meets a corresponding predetermined condition, performing a scan at the first wireless communication device via a local wireless link to locate at least one second wireless communication device;
determining at the first wireless communication device whether the requested data file is stored at the second wireless communication device with which the first wireless communication device communicates via the local wireless link; and
if the requested data file is determined to be stored at the second wireless communication device, the first wireless communication device retrieving the requested data file from second wireless communication device via the local wireless link if a download of the file is faster from the second wireless communication device via the local wireless link than from a networked source,
otherwise, the first wireless communication device downloads the file from the networked source even though the file is also stored on the second wireless communication device,
wherein the scan for the at least one local wireless communication device if the file size of the requested data file exceeds a predetermined threshold includes as a manual option via a graphical or text-based user interface to require a user authorization before downloading the file.

2. The method of claim 1, wherein, if the requested data file is determined not to be stored at the second wireless communication device, retrieving the requested data file from a primary data source via a wide area wireless communication network.

3. The method of claim 2, wherein when the request is received at the first wireless communication device, the first wireless communication device is in communication with the primary data source via the wide area wireless communication network.

4. The method of claim 1, wherein if the file size of the requested data file does not exceed the predetermined threshold, the first wireless communication device retrieves the requested data file from a primary data source via a wide area wireless communication link.

5. The method of claim 1, wherein the at least one second wireless communication device comprises a plurality of second wireless communication devices, the method further comprising sorting each of the plurality of second wireless communication devices to define a connection order for the requested data file.

6. The method of claim 1, wherein in response to the request received at the first wireless communication device and prior to determining whether the requested data file is stored at the second wireless communication device, the first wireless communication device performs a scan via the local wireless link to locate at least one second wireless communication device.

7. The method of claim 6, wherein the scan is performed contingent upon a local wireless access point not being available for downloading the requested data file.

8. The method of claim 1, further comprising storing the requested data file at the second wireless communication device in response to a second request initiated at the second wireless communication device prior to receiving the request at the first wireless communication device.

9. The method of claim 1, wherein the second wireless communication device obtained the requested data file via one of a wireless local area network or a wireless wide area network.

10. A wireless communication device comprising:
a first wireless transceiver configured to transmit and receive data via a wireless wide area network according to a first wireless technology, wherein the first wireless transceiver can receive and transmit via a wireless local area network and interact with a second wireless transceiver configured to transmit and receive via the wireless local area network data according to a second wireless technology that is different from the first wireless technology;
a processor programmed to execute file access controls that employ the second wireless transceiver to search for a local wireless communication device having already stored therein a copy of a requested data file and, in response to locating the local wireless communication device having the requested data file, the file access controls causing the requested data file to be retrieved from the local wireless communication device via the second wireless transceiver;

a request evaluator that is executed by the processor, the request evaluator being programmed to evaluate a request for the requested data file made at the first wireless communication device relative to predetermined file criteria;

wherein the predetermined file criteria further comprises file size, the communication control being programmed to activate the second wireless transceiver and scan for at least one local wireless communication device if the file size of the requested data file exceeds a predetermined threshold;

a caching engine executed by the processor, the caching engine being programmed to monitor storage of data files in a memory and to enter file criteria in a log that describes data files downloaded and stored in the memory thereof, wherein, in response to a file request from another local wireless communication device received via the second wireless transceiver, the caching engine is further programmed to compare criteria provided with the file request relative to the log to determine if the copy of a data file that is defined in the file request is stored in the memory of the wireless communication device, wherein the caching engine is programmed to send a copy of the data file being requested by the another local wireless communication device from memory if the data file being requested matches one of the files stored in memory based on comparison of information associated with the file request relative to the log, wherein the scan for at least one local wireless communication device if the file size of the requested data file exceeds a predetermined threshold can further present to a user a manual option to the user via a graphical or text-based user interface to require user authorization before downloading the file.

11. The wireless communication device of claim 10, further comprising:
a communication control that is programmed to employ the second wireless transceiver to scan for at least one other local wireless communication device capable of sending the copy of the requested data file only if the predetermined file criteria is satisfied.

12. The wireless communication device of claim 10, wherein
the first wireless transceiver comprises a cellular telephone transceiver configured to provide for data communication over a wide area cellular data network; and
the second wireless transceiver comprises a local area wireless transceiver that is configured to provide for data communication in wireless local area network and a peer-to-peer wireless network.

13. A system device to facilitate acquisition of a requested data file, comprising:
a first portable wireless communication device that receives a request to download the requested data file that was accessed, if the requested data file satisfies predetermined file criteria, the first portable wireless communication device employing a local wireless communication link to discover at least one second portable wireless communication device and to issue a request to the second portable wireless communication device for the requested data file;
the first portable wireless communication device configured to communicate with the second portable communication device, the second portable wireless communication device being programmed to determine if the requested data file is stored in memory thereof and, if the requested data file is stored in memory thereof, the second portable wireless communication device being programmed to send a copy of the requested data file directly to the first portable wireless communication device via the local wireless communication link,
wherein each of the first and second portable wireless communication devices comprises at least first and second wireless radio transceivers, respectively, the first wireless radio transceiver being configured for communication via a wide area wireless network and the second wireless radio transceiver being configured for communication via a local area wireless network and peer-to-peer wireless network,
wherein the predetermined file criteria further comprises file size,
wherein the first portable wireless communication device is programmed to scan the second portable wireless communication device if the file size of the requested file exceeds a predetermined threshold,
otherwise, the first wireless portable communication device downloads the file from a networked source even though the file is also stored on the second wireless communication device,
wherein the scan for the at least one local wireless communication device if the file size of the requested data file exceeds a predetermined threshold includes as a manual option via a graphical or text-based user interface to require a user authorization before downloading the file.

14. The device of claim 13, wherein, if the first portable wireless communication device does not locate the at least one second portable wireless communication device having stored in its memory the requested data file, the first portable wireless communication device being programmed to retrieve the requested data file from a primary data source where the first portable wireless communication device had accessed the requested data file using a wide area wireless data communication network.

* * * * *